United States Patent
Hannemann

(10) Patent No.: US 8,626,414 B2
(45) Date of Patent: Jan. 7, 2014

(54) METHOD AND DEVICE FOR EVALUATING A CONDITION OF A CHASSIS OF A VEHICLE

(75) Inventor: Dirk Hannemann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 13/136,239

(22) Filed: Jul. 26, 2011

(65) Prior Publication Data

US 2012/0035821 A1    Feb. 9, 2012

(30) Foreign Application Priority Data

Aug. 5, 2010  (DE) .......................... 10 2010 038 971

(51) Int. Cl.
*G06F 7/70*     (2006.01)
*G01M 17/00*   (2006.01)
*B60Q 1/00*    (2006.01)

(52) U.S. Cl.
USPC .............................. 701/70; 701/31.4; 340/438

(58) Field of Classification Search
None
See application file for complete search history.

(56) References Cited

U.S. PATENT DOCUMENTS

| | | | |
|---|---|---|---|
| 6,188,948 B1 * | 2/2001 | Shivler, Jr. ....................... | 701/76 |
| 6,954,691 B2 * | 10/2005 | Roll et al. ........................ | 701/70 |
| 6,998,974 B2 * | 2/2006 | Bergerhoff et al. ............ | 340/444 |
| 2002/0128751 A1 * | 9/2002 | Engstrom et al. .................. | 701/1 |
| 2003/0090372 A1 * | 5/2003 | Bergerhoff et al. ............ | 340/438 |
| 2004/0133319 A1 * | 7/2004 | Pillar et al. ....................... | 701/29 |
| 2006/0116799 A1 * | 6/2006 | Mahlo ............................. | 701/29 |
| 2007/0223996 A1 * | 9/2007 | Green et al. ....................... | 404/9 |
| 2008/0103651 A1 * | 5/2008 | Pillar et al. ....................... | 701/29 |
| 2009/0150314 A1 * | 6/2009 | Engstrom et al. ............... | 706/21 |
| 2010/0174566 A1 * | 7/2010 | Helitzer et al. .................... | 705/4 |
| 2011/0144879 A1 * | 6/2011 | Miller et al. .................... | 701/70 |
| 2013/0072351 A1 * | 3/2013 | Wallace et al. ............... | 477/183 |

FOREIGN PATENT DOCUMENTS

| | | |
|---|---|---|
| DE | 10 2004 058 359 | 7/2005 |
| DE | 10 2004 029 370 | 1/2006 |
| DE | 10 2006 028 277 | 12/2007 |
| DE | 10 2008 037 950 | 2/2010 |
| EP | 1 826 530 | 8/2007 |

* cited by examiner

*Primary Examiner* — Mussa A Shaawat
(74) *Attorney, Agent, or Firm* — Kenyon & Kenyon LLP

(57) ABSTRACT

In a method for evaluating the condition of a chassis of a vehicle equipped with a brake control system and a device for detecting trip data, at least one control signal of the brake control system is combined with at least one output signal of the device for detecting trip data to obtain a combined signal, and the condition of the chassis is evaluated on the basis of the combined signal.

9 Claims, 2 Drawing Sheets

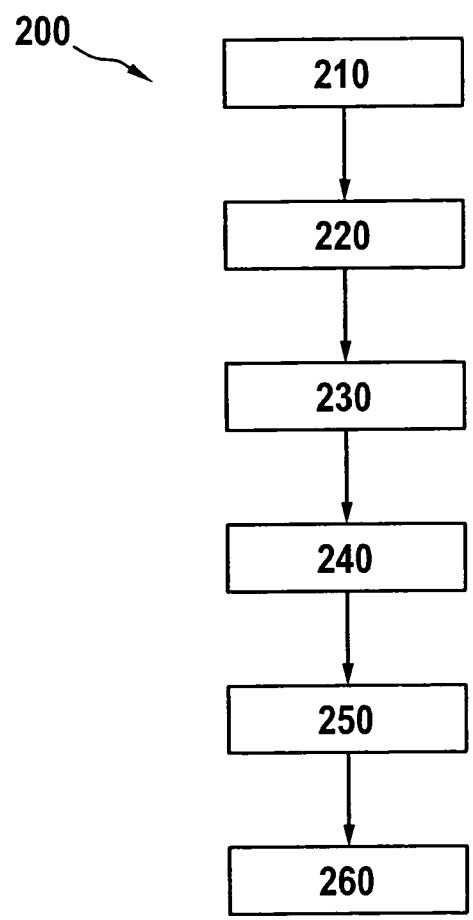

METHOD AND DEVICE FOR EVALUATING A CONDITION OF A CHASSIS OF A VEHICLE

BACKGROUND OF THE INVENTION

1. Field of the Invention

The present invention relates to a device and a method for evaluating a condition of a chassis of a vehicle.

2. Background of the Invention

Tires on a vehicle undergo aging, i.e., they become brittle and harder with advancing age and the tread declines with the distance traveled, so their traction properties gradually worsen without the driver noticing it. Although tread depth is easy to check, the overall condition is difficult to evaluate. Other properties of the overall chassis, such as the shock absorbers and the wheel alignment, also change slowly. They all influence road traction.

Published German patent application document DE 10 2006 028 277 A1 discloses a device and a method for curve advance warning, having a control unit connected to a memory containing map data, and ascertains a current position with the aid of positioning determination means, so that a curvature in the road is calculable on the basis of the map data for a preselectable preceding road section and a curve setpoint speed is calculable and displayable as a recommendation on the basis of the curvature and input values, preferably inputtable by an operator with the aid of input means.

BRIEF SUMMARY OF THE INVENTION

The present invention provides a method for evaluating a condition of a chassis of a vehicle, the vehicle having a brake control system and means for detecting trip data, the method including the following steps: combining at least one control signal of the brake control system with at least one output signal of the means for detecting trip data to obtain a combined signal; and evaluating the condition of the chassis on the basis of the combined signal.

A vehicle may be understood to be a motor vehicle, in particular a road vehicle, for example, a passenger vehicle or a truck. A chassis of the vehicle includes moving parts of the vehicle which connect the vehicle to the road surface. These moving parts include, for example, wheels, wheel suspension, suspension, shock absorbers, steering and the service brake. The condition of the vehicle relates to a functionality of the chassis as intended. A poor condition of one or more parts of the chassis may have a negative effect on the functionality of the chassis. The brake control system may be an electronic system such as an antilock braking system (ABS), a traction control system (TCS) and/or an electronic stability program (ESP). The brake control system ensures a secure road holding of the vehicle during acceleration and deceleration operations and when negotiating curves by intervening in other vehicle systems via control signals. The means for detecting trip data may be means for determining the position of the vehicle, for example, a navigation system. A navigation system enables targeted guidance to a selected location or a route, taking into account desired criteria, with the help of position determination and stored geo information. The navigation system may also ascertain trip data, for example, speed information and/or acceleration information from position information. Position information, speed information and/or acceleration information may represent output signals of the means for detection of trip data. The combining step may involve a mathematical or logical linking of signals, for example, using basic arithmetics. The combined signal is formed from this linkage or combination. In the evaluation step, the condition of the chassis is inferred with the aid of suitable algorithms or devices and according to predefined regulation of the combined signal.

The present invention also provides a device for evaluating a condition of a chassis of a vehicle in which the device has data of a brake control system and means for detecting trip data, the device including the following features: a unit for combining at least one control signal of the brake control system with at least one output signal of the means for detecting trip data to obtain a combined signal; and a unit for evaluating the condition of the chassis on the basis of the combined signal.

However, the device need not include the brake control system and/or the means for detecting trip data, but instead data from units already installed in the vehicle may be used further for the present invention.

The present invention thus provides a device or a chassis condition detection unit, which is designed to perform and execute the steps of the method according to the present invention. In particular the device or the chassis condition detection unit may have equipment designed to execute one step each of one of the methods. The object on which the present invention is based may be achieved rapidly and efficiently through this embodiment variant of the present invention in the form of a device or a chassis condition detection unit.

In the present case, a device or a chassis condition detection unit may be understood to be an electric unit, which processes the sensor signals and outputs control or chassis condition detection signals as a function thereof. The device or the chassis condition detection unit may have an interface, which may be designed as hardware and/or software. In the case of hardware, the interfaces may be part of a so-called system ASIC, for example, which includes a wide variety of functions of the device or the control unit. However, it is also possible for the interfaces to be their own integrated circuits or be made up at least partially of discrete components. In the case of software, the interfaces may be software modules, which are present, for example, on a microcontroller in addition to other software modules.

A computer program product having program code, which is stored on a machine-readable carrier, such as a semiconductor memory, a hard drive memory or an optical memory, and is used to perform one of the methods according to the present invention when the program is executed on a device or a chassis condition detection unit is also advantageous.

The present invention is based on the finding that an evaluation of the condition of the tires and chassis makes it possible to warn the driver of a slow deterioration of the tire condition or the chassis properties. Analyzing the signals of electronic brake control systems via the intervention of these systems is put in relation to the assumed road condition and thus the assumed road traction, the speed of the vehicle and the course of the road in order to evaluate the condition of the tires.

On the one hand, this evaluation may be performed when negotiating curves, for example, where the navigation system or the means for detecting trip data, taking into account all the available information, for example, the curve radius, moisture or wetness, a recommended maximum speed, which, if maintained with a faultlessly functioning chassis, for example, with new tires, should not result in an intervention in the electronic brake control systems. If the electronic brake control systems nevertheless respond, this may indicate a poor condition of the tires. This relationship is evaluated according to one specific embodiment of the present invention in order to be able to draw conclusions about the condition of the chassis.

On the other hand, this evaluation may be performed during acceleration/deceleration of the vehicle. Obtained acceleration or deceleration values may also be used for an evaluation. For example, frequent response of the electronic brake control systems when the road is assumed to be dry and accelerations/decelerations are low may also indicate tire wear.

The advantages of the present invention include the fact that information may be analyzed in a manner that would not be possible with the individual systems due to the cross-linking of the electronic brake control system and the navigation system. The driver is warned if the tire condition is becoming progressively worse and may have the tires checked by a specialist, for example. Furthermore, it is advantageous to initially collect the individual results in a statistics module and to issue a warning only when there is an accumulation of events. Prompt correction of any chassis problems, for example, replacing the tires, as is made possible in a more reliable and safe manner according to one specific embodiment of the present invention, increases traffic safety.

According to one specific embodiment, in the step of combining, data representing at least one item of position information, speed information and/or acceleration information from a navigation system may be used as the output signal of the means for detecting data, and data originating from an antilock braking system (ABS), a traction control system (TCS) and/or an electronic stability program (ESP) may also be used as the control signal of the brake control system. This offers the advantage that data present anyway in a vehicle equipped with a brake control system and a navigation system are used and may be made accessible, i.e., usable, with no problem.

According to one specific embodiment, in the step of combining and/or evaluating, vehicle-specific and/or chassis-specific information and/or information about the surroundings transmitted from at least one other vehicle may also be used. Vehicle-specific and/or chassis-specific information may be understood to refer to vehicle-specific and/or chassis-specific properties, for example, tire-specific properties. In concrete terms, this may be manufacturer's information. The ambient information may include information about a road condition due to the weather, for example. This offers the advantage that taking into account vehicle-specific and tire-specific properties (manufacturer's information) may improve the result of the evaluation. Vehicles may exchange empirical values about the road condition by communicating from one vehicle to another, so-called car-to-car communication. If most or all vehicles in the immediate vicinity are reporting that roads are not slick, but the electronic brake control systems are responding too frequently in one's own vehicle for the speed of the vehicle or the braking deceleration, this may indicate a poor tire condition. Thus the condition of the chassis may be evaluated even more reliably.

According to one specific embodiment, the steps of combining and evaluating may be performed separately for at least two wheels of the vehicle. At least two wheels of the vehicle may receive different brake trigger signals, so that the different trigger signals may also be used for the separate evaluation of the condition of the chassis. For example, at least one left wheel and one right wheel, at least one front wheel and at least one rear wheel or all wheels may be considered separately from one another in order to be able to determine the condition of the chassis on the whole. This has the advantage that chassis parts may also be evaluated with regard to their condition, even if they have not undergone a separate evaluation procedure. Poor road traction may also be an indication of defective shock absorbers or a misalignment of the wheels of the vehicle.

According to one specific embodiment, this method includes an additional step of collecting the evaluated conditions of the chassis in a statistics module and another step of statistical analysis-of the collected evaluated conditions. A statistics module may be understood to be a memory element, in which the evaluated conditions may be stored as data. It is appropriate here to collect only negatively evaluated conditions of the chassis, which indicate a suboptimal or worsened condition of the chassis. A suitable program for statistical analysis may access the data stored in the statistics module. In the statistical analysis, it is possible to check for exceeding or falling below a threshold value, for example, which is based on a frequency of occurrence of negatively evaluated conditions within a defined period of time. This offers the advantage that it creates a data collection which permits even more reliable conclusions about the actual condition of the vehicle and over a longer period of time than is possible on the basis of a single evaluated condition.

According to one specific embodiment, the method may have an additional step of outputting a warning signal when the evaluated condition of the chassis or information derived therefrom meets a warning criterion. The output of a warning signal may be visual and/or acoustic for an occupant of a vehicle, for example. Information derived from the evaluated condition of the chassis may indicate whether the chassis as a whole or individual parts thereof is in a good or poor condition. The warning criterion may be met on exceeding a threshold value, which is based on a frequency of occurrence of negatively evaluated conditions within a defined period of time. This offers the advantage that vehicle occupants may be informed about a condition of the chassis and then the driver may suitably adjust his driving style.

According to one specific embodiment, the method may include an additional step of storing the evaluated condition of the chassis or information derived therefrom in a memory for a vehicle inspection. A memory for a vehicle inspection may be understood to be an error memory, which may be read out during a vehicle inspection using manufacturer-specific equipment. This offers the advantage that by feeding data into the error memory of the vehicle, with appropriate vehicle cross-linking, the condition of the chassis may be analyzed during an inspection by the workshop. An analysis may also be performed on each wheel/shock absorber and the results entered into the error memory. If messages about the condition of the chassis are thus stored in the error memory and these messages are indicative of a poor condition, then the chassis or parts thereof may be checked, adjusted, repaired or replaced. There is thus a definitely reduced risk of overlooking safety-relevant damage conditions of the chassis.

According to one specific embodiment, in a method for curve advance warning for a vehicle, an evaluated condition of a chassis of a vehicle may be used in the method according to the present invention to determine a maximum or recommended curve speed. Modern navigation systems offer the driver a curve advance warning function, a so-called curve alarm. In one curve advance warning method for a vehicle, a maximum drivable speed for the given curve is calculated based on the course of the digitized road in front of the vehicle, in particular a curve radius of a given curve, and assumed road. traction, in particular the coefficient of friction, and when this speed is exceeded, a warning is issued. In addition, the assumed road traction is determined better and more accurately by analyzing additional sensors such as rain sensors and outside thermometers and analyzing the signals of electronic brake control systems (ABS, TCS, ESP). The ascertained tire condition may in turn be used to determine the road traction and may thus be incorporated in the curve alarm. This offers the advantage that an important additional parameter is used with the evaluated condition of the chassis, permitting a safe maximum curve speed to be ascertained.

BRIEF DESCRIPTION OF THE DRAWINGS

FIG. 2 shows a flow chart of a method according to an exemplary embodiment of the present invention.

DETAILED DESCRIPTION OF THE INVENTION

Figure 1:
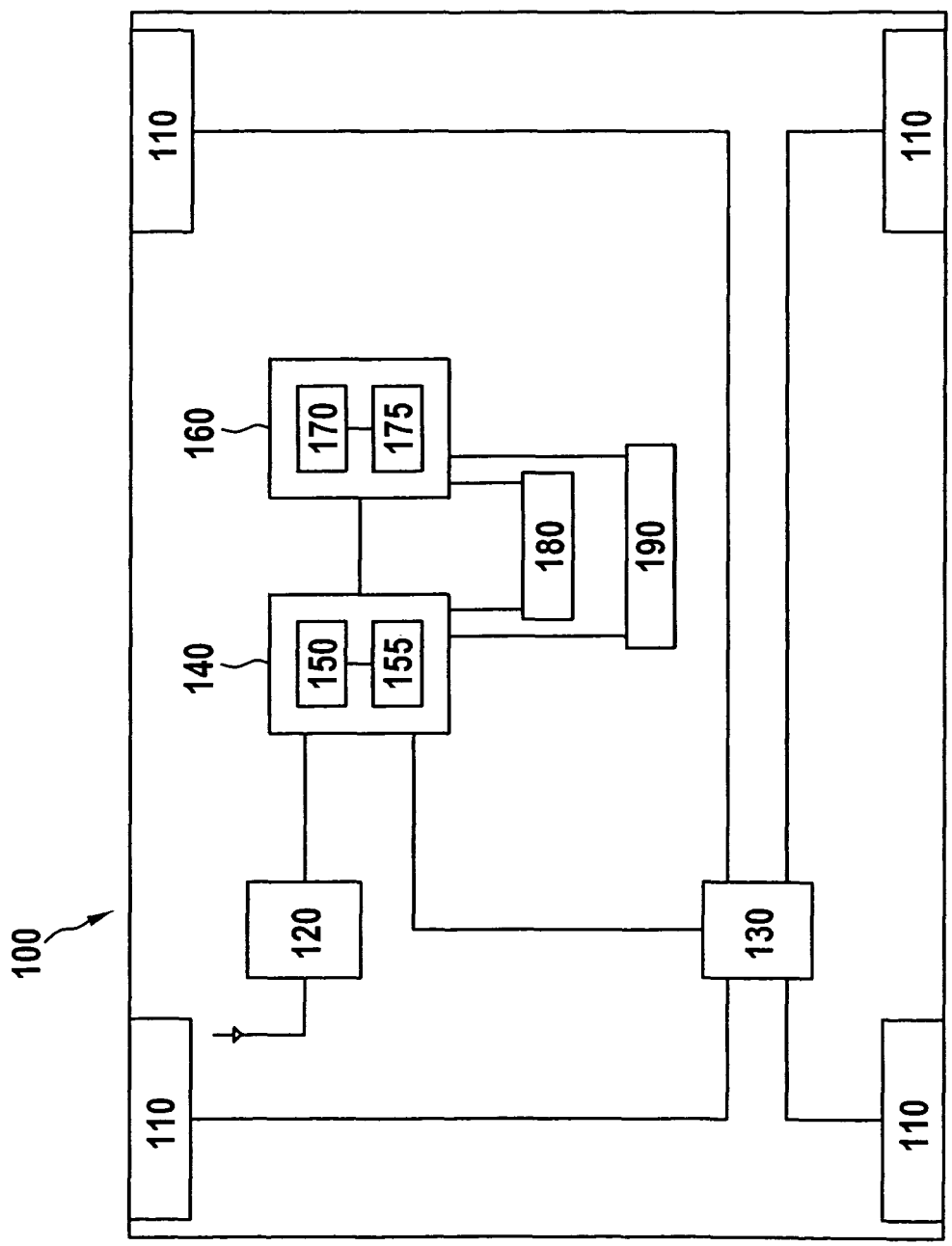
FIG. 1 shows a block diagram of a device according to one exemplary embodiment of the present invention.

The drawings and the description contain numerous features in combination, and it will be clear to those skilled in the art that these features may also be considered individually or combined into additional combinations not described explicitly here. Furthermore, method steps according to the present invention may be repeated and executed in a different sequence than that described here. If an exemplary embodiment includes an "and/or" linkage between a first feature/step and a second feature/step, this may be interpreted to mean that the exemplary embodiment according to one specific embodiment includes both the first feature/the first step and the second feature/the second step and according to an additional specific embodiment includes either only the first feature/the first step or only the second feature/the second step.

FIG. 1 shows a block diagram of a device according to one exemplary embodiment of the present invention. This shows a vehicle 100, four wheels 110, a navigation system 120, a brake control system 130, a device 140 for evaluating a condition of a chassis of a vehicle, a combination unit 150, an evaluation unit 155, a statistics module 160, a collecting unit 170, an analyzing unit 175, a warning output unit 180 and an error memory 190.

In vehicle 100 having four wheels 110, navigation system 120 and brake control system 130 are situated, with which device 140 for evaluating a condition of a chassis (for the sake of simplicity, only four wheels 110 of the chassis are shown in FIG. 1) of a vehicle is connected. Device 140 has combination unit 150 and evaluation unit 155. Furthermore, statistics module 160 having collecting unit 170 and analysis unit 175 is situated in vehicle 100 and is connected to device 140. Warning output unit 180 and error memory 190 of vehicle 100 are connected to device 140 and statistics module 160.

On the one hand, brake control system 130 is connected to four wheels 110 of vehicle 100. Each of four wheels 110, in particular a brake system of each wheel 110, is connected to brake control system 130. Brake control system 130 includes, for example, an antilock braking system (ABS), a traction control system (TCS) and/or an electronic stability program (ESP). Brake control system 130 interacts with four wheels 110 in a manner which is known in the field. On the other hand, brake control system 130 is connected to device 140.

On the one hand, navigation system 120 is connected to an antenna (shown at the left next to navigation system 120 in FIG. 1). Navigation system 120 is designed, for example, to be satellite- or radio-supported, as is known in the field. A navigation system 120, which is widely used in the market, is based on GPS (global positioning system). The antenna of navigation system 120 is thus, for example, a GPS or radio transceiver. On the other hand, navigation system 120 is connected to device 140.

Device 140 for evaluating the condition of a chassis of a vehicle is connected to navigation system 120 and brake control system 130 as well as statistics module 160, warning output unit 180 and error memory 190. Combining unit 150 and evaluation unit 155 are part of device 140. Units 150, 155 of device 140 are connected to one another, and device 140 and the systems modules and units connected to it are interconnected so that a method according to the present invention for evaluating a condition of a chassis of a vehicle is executable.

Statistics module 160 has collecting unit 170 and analysis unit 175. Collecting unit 170 is present in the form of a memory, for example. Analysis unit 175 is connected to collecting unit 170 and accesses stored content of collecting unit 170 to analyze same statistically. Statistics module 160 is connected to device 140, warning output unit 180 and error memory 190.

Warning output unit 180 is connected to device 140 and statistics module 160. Warning output unit 180 is, for example, a display and/or a loudspeaker, which is/are part of a dashboard of vehicle 100. The display includes here, for example, a warning light or a display field on the dashboard, on a navigation unit or on a center console, which is designed for outputting an alphanumeric message.

Error memory 190 of vehicle 100 is connected to device 140 and statistics module 160. Error messages of various systems and modules of vehicle 100 are storable in error memory 190. During a repair or a regular inspection of vehicle 100, error memory 190 may be read out to facilitate troubleshooting or error diagnosis and subsequent fault repair.

The functioning of device 140 for evaluating a condition of a chassis in vehicle 100 is explained below according to the exemplary embodiment of the present invention shown in FIG. 1.

Navigation system 120 calculates position information for vehicle 100 on a digital road map from input signals from the antenna and additional input signals in the form of data from other vehicle sensors (not shown). These other vehicle sensors may be, for example, sensor elements such as a gyrometer or an acceleration sensor in the navigation unit. Information about a speed and an acceleration of vehicle 100 may be derived from position information determined in chronological succession. Furthermore, in the exemplary embodiment of the present invention shown in FIG. 1, the navigation system also calculates a recommended maximum curve speed for a given curve. Navigation system 120 outputs the output signals, for example, the above-mentioned position information, speed information, acceleration information and/or curve speed information to device 140.

Brake control system 130 is communicatively linked to the brake system of each wheel 110 of vehicle 100. The type and manner of interaction of brake control system 130 with the brake systems of wheels 110 are sufficiently well known to those skilled in the art in this field and therefore will not be discussed further here. Brake control system 130 delivers an output signal to device 140 when there is an intervention of brake control system 130 into the driving operation.

Device 140 thus receives input signals from navigation system 120 and brake control system 130. Furthermore, device 140 may also use additional data as the calculation basis, for example, vehicle-specific and/or chassis-specific properties in the form of manufacturer's specifications as well as empirical values about the road condition transmitted from other vehicles. For example, signals from vehicle sensors may be used as means for detecting trip data, these means having suitable sensor elements, for example, a rain sensor for detecting wetness or moisture. An outside thermometer may also be provided as a vehicle sensor which detects data with regard to an outside temperature. These signals of the vehicle sensors may also supply trip data which are combined in the device with the signals of the brake control system. The input signals of device 140 are initially processed in combining unit 150. The input signals are combined here in the sense of a logic combination or using basic arithmetics. Combining unit 150 generates a combine signal from the input signals. Combining unit 150 then outputs this combined signal to evaluation unit 155. Evaluating unit 155 draws conclusions about the condition of the chassis of vehicle 100 from the condition of the combined signal.

A condition of the combined signal may refer to whether or not the speed at which vehicle 100 is currently being driven is higher than the recommended maximum curve speed. Assuming the chassis is in a good condition, this should not result in a response or intervention of electronic brake control system 130 if the speed currently being driven is no higher than the recommended maximum curve speed. If brake control system 130 nevertheless responds, this suggests a poor condition of the chassis. The condition of the combined signal may also refer to whether there is a response of brake control system 130 at the positive or negative acceleration currently achieved. If, assuming a dry road condition and a low acceleration, brake control system 130 nevertheless responds or even responds frequently, for example, this indicates a poor condition of the chassis.

After evaluating unit 155 has evaluated and processed the combined signal, there are various options for how to proceed further. The evaluated combined signal may be output directly to warning output unit 180 in the event an ascertained poor condition of the chassis is output by device 140 through which vehicle occupants are warned about a poor condition of the chassis. In the case of an ascertained poor condition of the chassis, the evaluated combined signal may be sent from device 140 to error memory 190, from which the poor condition of the chassis may then be read out during an inspection of vehicle 100.

However, it appears to be reasonable to initially collect the individual results in statistics module 160 first in the form of the evaluated combined signals, which indicate a poor condition of the chassis and to output a warning via warning output unit 180 only when there has been an accumulation of events and/or to prompt an entry into error memory 190. To do so, the evaluated combined signals are output by device 140 to statistics module 160. The evaluated combined signals are stored in statistics module 160 in collecting unit 170. Analysis unit 175 performs a statistical analysis on the stored evaluated combined signals. If the statistical analysis indicates an accumulation of events above a predefined threshold value, statistics module 160 outputs a statistically analyzed signal based on the stored evaluated combined signals, to warning output unit 180 and/or to error memory 190.

It is also conceivable to send the evaluated condition of the chassis of vehicle 100 to navigation system 120 either from device 140 or from statistics module 160. The evaluated condition of the chassis may be used here for a more accurate ascertainment of the recommended maximum curve speed.

FIG. 2 shows a flow chart of a method 200 for evaluating a condition of a chassis of a vehicle according to one exemplary embodiment of the present invention. In a step 210, at least one control signal of a brake control system is combined with at least one output signal of a navigation system to obtain a combined signal. In combining step 210, for example, data representing at least one item of position information, speed information and/or acceleration information are used as the output signal of the navigation system. Furthermore, in step 210 of combining data originating from an antilock braking system (ABS), a traction control system (TCS) and/or an electronic stability program (ESP) may be used as the control signal of the brake control system.

In a step 220, the condition of the chassis is evaluated based on the combined signal. In addition, in combining step 210 and/or evaluation step 220, for example, vehicle-specific and/or chassis-specific information and/or information about the surroundings transmitted from at least one other vehicle is/are used. In a step 230, evaluated conditions of the chassis are collected in a statistics module. In a step 240, the collected evaluated conditions are analyzed statistically. In a step 250, a warning signal is output when the evaluated condition of the chassis or information derived therefrom meets a warning criterion. In a step 260, the evaluated condition of the chassis or information derived therefrom is stored in a memory for a vehicle inspection.

What is claimed is:

1. An automated method for assisting a driver based on an evaluation of a condition of a chassis of a vehicle having a brake control system and a device for detecting trip data, comprising:
    combining, by an evaluation unit of the vehicle, at least one control signal of the brake control system with at least one output signal of the device for detecting trip data to obtain a combined signal, wherein the combined signal indicates whether a current speed of the vehicle is lower than a predetermined recommended maximum speed;
    evaluating, by the evaluation unit of the vehicle, the condition of the chassis on the basis of the combined signal, wherein the evaluation includes determining whether the brake control system intervenes with an automated control operation in the case the combined signal indicates the current speed of the vehicle is lower than the predetermined recommended maximum speed; and
    outputting, by a warning system of the vehicle, at least one of an audio and visual warning signal indicating a poor chassis condition, if the brake control system intervenes with an automated control operation in the case the combined signal indicates the current speed of the vehicle is lower than the predetermined recommended maximum speed.

2. The method as recited in claim 1, wherein the output signal of the device for detecting trip data is data representing at least one of position information, speed information and acceleration information from a navigation system, and wherein the control signal of the brake control system is data generated by at least one of an antilock braking system, a traction control system and an electronic stability program.

3. The method as recited in claim 2, wherein at least one of vehicle-specific information of the vehicle, chassis-specific information of the vehicle, and information about the surroundings transmitted from at least one other vehicle is also used in at least one of the combining step and the evaluating step.

4. The method as recited in claim 2, wherein the combining step and the evaluating step are i) performed for a first wheel of the vehicle, and ii) separately performed for a second wheel of the vehicle.

5. The method as recited in claim 2, wherein the combining step and the evaluating step are repeated multiple times, the method further comprising:
    collecting evaluated conditions of the chassis in a statistics module; and
    performing a statistical analysis of the collected evaluated conditions.

6. The method as recited in claim 1, further comprising:
storing one of the evaluated condition of the chassis or information derived from the evaluated condition in a memory for a vehicle inspection.

7. The method as recited in claim 1, wherein the method is used for a curve-speed warning.

8. A device for evaluating a condition of a chassis of a vehicle equipped with a brake control system and a device for detecting trip data of the vehicle, comprising:
   a combining unit configured to combine at least one control signal of the brake control system with at least one output signal of the device for detecting trip data to obtain a combined signal, wherein the combined signal indicates whether a current speed of the vehicle is lower than a predetermined recommended maximum speed;
   an evaluation unit configured to evaluate the condition of the chassis on the basis of the combined signal, wherein the evaluation includes determining whether the brake control system intervenes with an automated control operation in the case the combined signal indicates the current speed of the vehicle is lower than the predetermined recommended maximum speed; and
   a warning system configured to output at least one of an audio and visual warning signal indicating a poor chassis condition, if the brake control system intervenes with an automated control operation in the case the combined signal indicates the current speed of the vehicle is lower than the predetermined recommended maximum speed.

9. A non-transitory, computer-readable data storage medium storing a computer program having program codes which, when executed on a computer, performs a method for evaluating a condition of a chassis of a vehicle having a brake control system and a device for detecting trip data, the method comprising:
   combining at least one control signal of the brake control system with at least one output signal of the device for detecting trip data to obtain a combined signal, wherein the combined signal indicates whether a current speed of the vehicle is lower than a predetermined recommended maximum speed;
   evaluating the condition of the chassis on the basis of the combined signal, wherein the evaluation includes determining whether the brake control system intervenes with an automated control operation in the case the combined signal indicates the current speed of the vehicle is lower than the predetermined recommended maximum speed; and
   outputting at least one of an audio and visual warning signal indicating a poor chassis condition, if the brake control system intervenes with an automated control operation in the case the combined signal indicates the current speed of the vehicle is lower than the predetermined recommended maximum speed.

* * * * *